R. H. DEAN.
COMBINATION TOOL.
APPLICATION FILED MAR. 18, 1920.
1,358,530.
Patented Nov. 9, 1920.
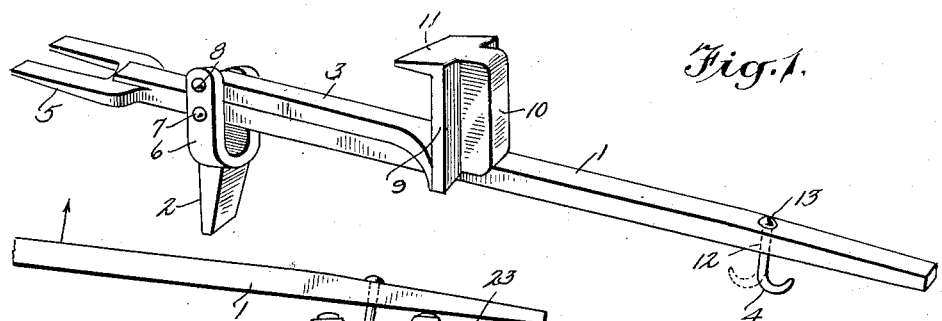
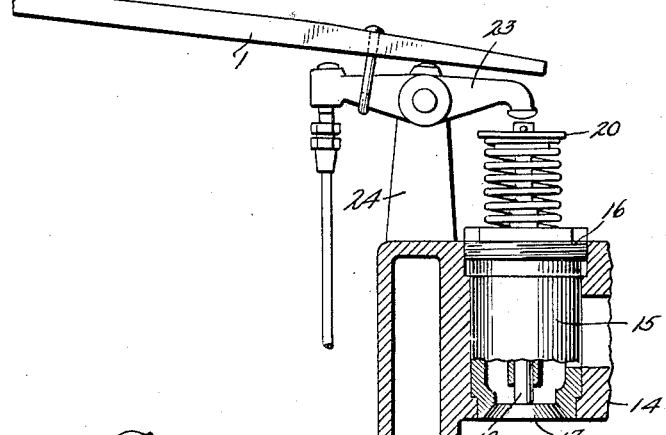
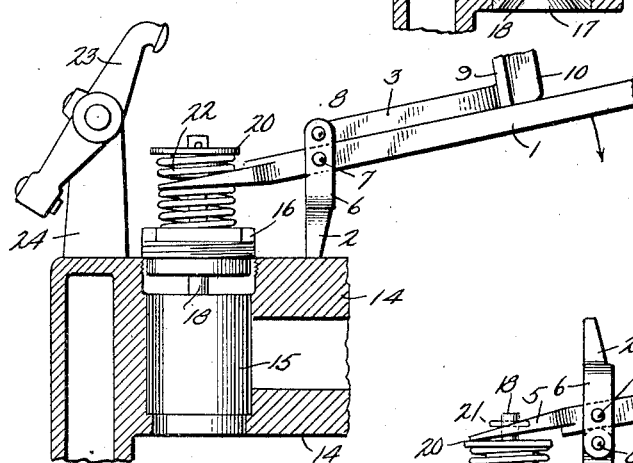
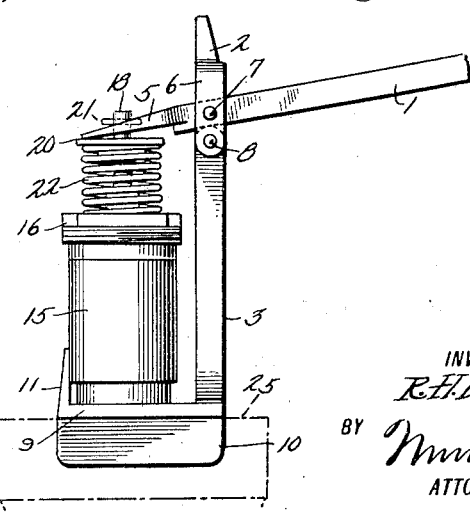
WITNESSES
INVENTOR
R. H. DEAN,
BY
ATTORNEYS ured of Letters Patent.

UNITED STATES PATENT OFFICE.

ROYAL HENRY DEAN, OF SIOUX CITY, IOWA.

COMBINATION-TOOL.

1,358,530.

Specification of Letters Patent.

Patented Nov. 9, 1920.

Application filed March 18, 1920. Serial No. 366,815.

*To all whom it may concern:*

Be it known that I, ROYAL H. DEAN, a citizen of the United States, and a resident of Sioux City, in the county of Woodbury and State of Iowa, have invented a new and Improved Combination-Tool, of which the following is a full, clear, and exact description.

This invention relates to improvements in combination tools, an object of the invention being to provide a tool which performs a number of functions in connection with the valves of internal combustion engines and is particularly adapted for use in connection with the valve and valve cage of the well-known type of Buick engine in general use.

A further object is to provide a tool which can be manipulated to remove the valve cage on the engine cylinder, to raise the rocker arm and also to compress the valve spring to permit a release of the pin in the valve stem holding the spring assembled thereon.

With these and other objects in view the invention consists in certain novel features of construction, and combinations and arrangements of parts as will be more fully hereinafter described and pointed out in the claims.

In the accompanying drawings—

Figure 1 is a perspective view of my improved tool;

Fig. 2 is a view showing the position of the tool when lifting the rocker arm;

Fig. 3 is a view showing the tool in position for pulling or withdrawing the valve cage from the engine cylinder; and Fig. 4 is a similar view showing the tool in position to compress the valve spring.

My improved tool comprises four main parts; namely, a bar or lever 1, a fulcruming device 2, a bracket 3, and a hook 4. The bar or lever 1 is of any desired length and is provided at one end with a fork 5 which may be made of the desired thickness to perform the functions intended.

The fulcruming device 2 is provided with a bifurcated end 6 straddling the bar 1 in rear of the fork 5 and pivotally connected to the bar 1 by a rivet 7. One end of the bracket 3 is pivotally connected to the bifurcated end 6 of the fulcruming device 2 by means of a rivet 8 and this bracket 3 at its free end is made with a supporting platform 9 having a web 10 on its under face and provided with a lip 11 at its free end. The hook 4 is projected through an opening 12 in the bar or lever 1 and has a head 13 at its end preventing longitudinal movement of the hook yet permitting the hook to be swung to any position desired.

14 represents an engine cylinder and 15 a valve cage located in the cylinder and having a threaded nut 16 to secure the same in the cylinder. 17 is the valve located at the inner end of the cage and having a stem 18 projecting through the cage and at its upper end provided with a disk 20, with a pin 21 above the disk, and a coiled spring 22 between the disk 20 and the nut 16 normally holding the valve in closed position. 23 represents the rocker arm for engaging the stem 18 to operate the valve 17 and this rocker arm is supported upon a post 24 as is customary in the art.

The engine structure above described is the common Buick structure in general use and my improved tool is devised with a view of controlling the removal of the valve cage and the operation of the parts, as will hereinafter appear.

In Fig. 2, I show the position of my improved tool for exerting downward pressure on the rocker arm. In this position the hook 4 is engaged under the outer end of the rocker arm 23 and the bar or lever 1 is fulcrumed on the upper end of the post 24, so that an upward movement of the outer end of the lever will operate to force the free end of the rocker arm downwardly.

In Fig. 3, I show the position of my improved tool for pulling out or withdrawing the valve cage from the engine cylinder. The nut 16 is turned to release the cage from the engine cylinder and the forked end 5 of the lever is located so as to straddle the valve stem 18 and is located between the convolutions of the spring 22. The fulcruming device 2 is in upright position resting against the engine cylinder 14 so that when a downward pressure is applied to the outer or free end of the lever 1, the valve cage will be forced out of the engine cylinder.

Fig. 4 illustrates my improved tool in position to compress the spring 22 and allow the pin 21 to be removed. In this position the bracket 3 supports the cage 15 on its platform 9. The forked end 5 of the lever 1 straddles the valve stem 18 above the disk 20 so that when an upward pressure is applied to the outer end of the lever 1, the spring will be compressed relieving pressure against the pin 21 to allow the latter to be removed. When the tool is used for compressing the spring, the platform 9 can be conveniently braced against any suitable support 25 and the web 10 provides a downwardly projecting portion at right angles to the platform engaging said support so as to prevent lateral movement of the platform during its operation.

It will thus be noted that my improved tool is capable of various operations, and hence is a convenient means for manipulating the valve structure as above described.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A combination tool of the character described, comprising a lever, a fork at one end of the lever, a fulcruming device having a bifurcated end straddling the lever, and a bracket pivotally connected to said bifurcated end.

2. A tool of the character described, comprising a lever, a fork at one end of the lever, a fulcruming device having a bifurcated end straddling the lever and pivotally connected thereto, and a bracket pivotally connected to the bifurcated end of the fulcruming device.

3. A tool of the character described, comprising a lever, a fork at one end of the lever, a fulcruming device having a bifurcated end straddling the lever and pivotally connected thereto and having its extremities extending therebeyond, a bracket pivotally connected to the extremities of said bifurcated end of the fulcruming device, a platform on the free end of said bracket, and a lip at the free end of the platform.

4. A tool of the character described, comprising a lever, a fork at one end of the lever, a fulcruming device having a bifurcated end straddling the lever and pivotally connected thereto, a bracket pivotally connected to the bifurcated end of the fulcruming device, a platform on the free end of said bracket, a lip at the free end of the platform, and a web located under the platform.

5. A tool of the character described, comprising a lever, a fork at one end of the lever, a hook pivotally connected to the lever adjacent its other end, a fulcruming device pivotally connected to the lever adjacent the fork, and a bracket pivotally connected to the fulcruming device.

ROYAL HENRY DEAN.